July 19, 1938.   J. SHACKLETON   2,124,213
INTERMITTENT GEARING
Filed Feb. 5, 1937

INVENTOR
JACK SHACKLETON
BY George S. Hastings
ATTORNEY

Patented July 19, 1938

2,124,213

UNITED STATES PATENT OFFICE 2,124,213

INTERMITTENT GEARING

Jack Shackleton, London, England, assignor to American Machine & Foundry Company, New York, N. Y., a corporation of New Jersey Application February 5, 1937, Serial No. 124,207
In Great Britain February 13, 1936

7 Claims. (Cl. 74—436)

This invention relates to transmission gearing whereby an intermittent drive may be imparted from a continuously rotating driving member.

More particularly the invention relates to the type of intermittent gear known as a Geneva drive.

According to the usual arrangement in a Geneva drive the period of drive of the intermittently driven member occurs over a comparatively short period of the cycle or a revolution of the driving member, while during the remainder of the cycle the driven member is at rest. Thus it is usual for the drive to occur during 90° of the revolution of the driver. This has the disadvantage that the intermittent moving phases of the driven member have to take place in a comparatively short time which is an objectionable feature when applied to high speed drives.

An object of the invention is to provide an improved Geneva drive in which the driving period of the driving member occurs over a substantial proportion of a revolution, the non-driving period being a correspondingly reduced portion of a revolution.

The invention consists in an intermittent gearing comprising a Geneva drive in which the cooperating elements on the driving and driven members are so arranged that they are in driving engagement over a period of a cycle which is greater than the rest period.

The invention also consists in an intermittent gearing comprising a Geneva drive having a rotary driving member or pin adapted intermittently to engage radial grooves in a driven member to impart an intermittent drive to said member, the pin entering and leaving each groove from the inner end whereby the driving phase occurs over a portion of a revolution of the driving member which is greater than the rest period.

The driven member may be provided with four grooves arranged on diameters at right-angles whereby the driving phase is 270° and the rest period 90° of the cycle.

Means are provided for locking the driven member during a non-driving period, such means comprising for example an interrupted locking ring carried by the driving member and adapted to co-operate with pairs of projections on the driven member.

In the accompanying drawing:—

Figure 1:
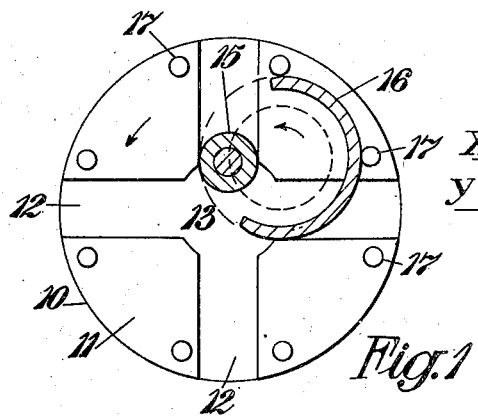
Figures 1 and 2 are end and side elevations of the improved Geneva drive according to the invention, these figures also illustrating one form of lock.
Figure 2:
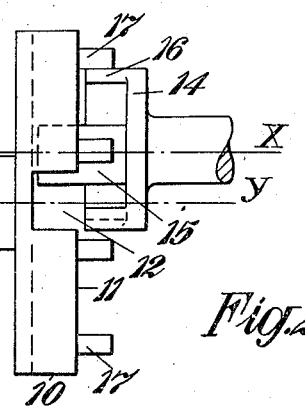

In carrying the invention into effect according to one convenient mode as in the drive for the web of a cork tipping machine as described in British Patent No. 464,161, the driving period is arranged to occur during 270° of a revolution of the driving member.

The driven member or disc 10 is provided on one face 11 with four radial grooves 12 arranged on diameters at right-angles to one another, the inner ends of the grooves opening into a central circular recess 13. The driving member comprising a disc 14 arranged in a plane parallel to the driven member or disc 10 is provided with a driving pin 15 adapted to move into driving engagement with each of the grooves 12 in turn. The driving member or disc 14 rotates on an axis $x-x$ eccentric to the axis $y-y$ of the driven member, the disposition of the parts being such that during the whole of a driving period the driving pin 15 will be located in one of the grooves 12 in the driven member, the entry into the groove and exit therefrom being from the inner end of such groove.

With the above described arrangement it will be appreciated that during a non-driving period the driving pin 15 will move idly through the central recess 13 in the driven member 14 this movement occupying 90° or a quarter of a revolution of the driving member. The pin 15 now enters a groove 12 from the inner end thereof and imparts rotation to the driven member. The pin 15 remains in the groove for 270° or three-quarters of the revolution of the driving member and during this period the driven member will be moved a quarter of a revolution. Thus the intermittent periods of movement of the driven member will each extend over three-quarters of a revolution of the driving member while the rest periods will only occupy a quarter of a revolution of the driving member.

The number of driving grooves on the driven member may be varied to vary the velocity ratio between the driving and driven members. Thus by providing three grooves spaced 120° apart, the driving period of the driving member will occupy 300° while the non-driving period will be 60°. Again by providing eight grooves, the driving period will be 225°, the non-driving period being 135° and so on.

Means are provided to lock the driven member 10 against rotation while the driving pin 15 is travelling through the central recess 13. According to one convenient arrangement the driving member 14 is provided with an interrupted locking ring 16 projecting from its face and concentric with the axis x—x, said ring being adapted to seat between pairs of dowels or projections 17 on the face of the driven member 10. The dowels are located adjacent the outer ends of the grooves 12 on either side thereof and the peripheral extent of the locking ring is such that when the driving pin is about to leave a groove 12 one end of the locking ring 16 engages the dowel 17 associated with such groove. At the same time the dowel 17 associated with the next groove 12 to be engaged by the driving pin is contacted by the ring. The length and disposition of the locking ring is such that when the driving pin 15 is about to enter the second groove the rear end of the wall leaves the second mentioned pin. During the rotation of the driven member 10, the pins 17 adjacent the end of the groove 12 engaged by the driving pin 15 will pass across the face of the driving disc within the locking ring 16.

Figure 3:
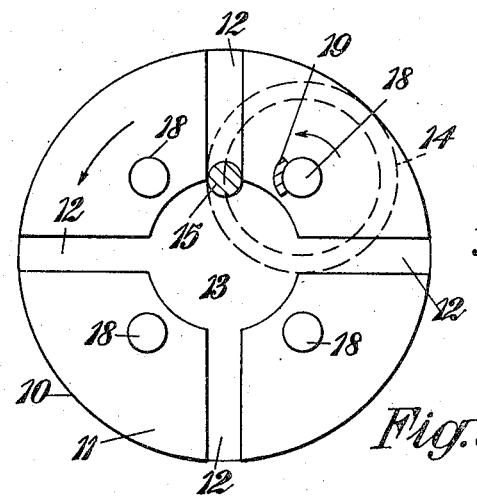
Figures 3 and 4 are similar views showing a modified form of locking means.
Figure 4:
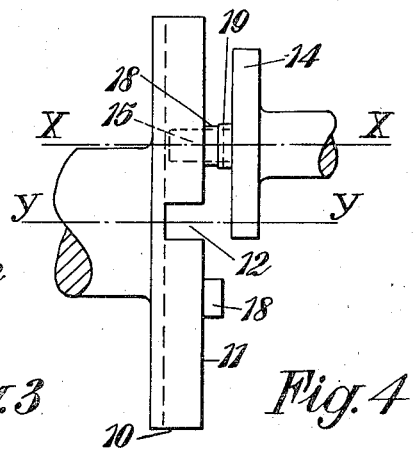

According to another arrangement, as shown in Figures 3 and 4, the driven member 10 may be provided with four locking studs 18 (if four grooves are provided) projecting from its face and adapted to be axially aligned with the axis x—x of the driving member 14 during the non-driving periods.

The driving member 14 is provided with a curved locking element 19 located on the same radius as the driving pin and adapted to engage the studs 18, the locking element during the non-driving period being adapted to lie inwardly of the appropriate stud. The arcuate length of the locking element 19 is such that the driven member will be locked against movement.

Figure 5:
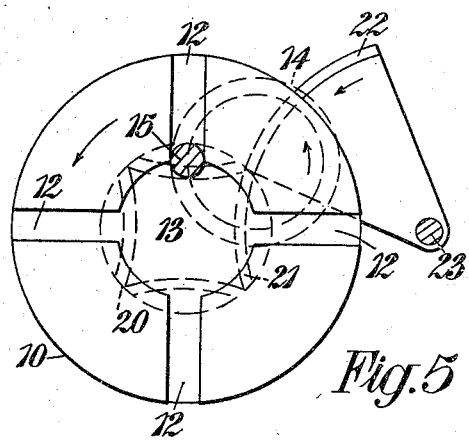
Figures 5 and 6 are end elevation and plan showing a further form of locking means.
Figure 6:
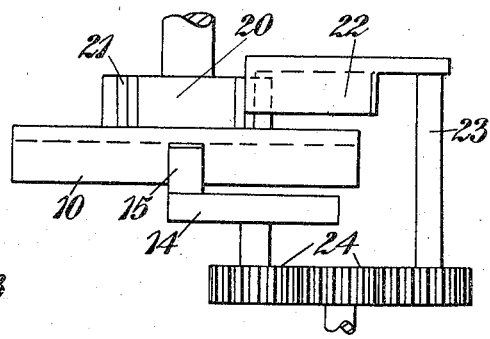

According to a further modification, see Figures 5 and 6, the driven member 10 on its rear face may be provided with a central boss 20 having a plurality of curved locking grooves 21, one for each driving groove 12. A rotary curved locking element or sector 22 is adapted to engage in the locking grooves 21, such element or sector being mounted upon a shaft 23 and driven from the driving member 14 through gears 24 having a 1:1 ratio. The sector 22 enters the appropriate locking groove 21 at the commencement of the rest period and leaves the groove at the end of the rest period.

While the invention has been described in connection with an intermittent drive for a cigarette tipping machine it will be appreciated that it may be applied in other fields where it is desired to utilize the greater part of the revolution of the driving element for imparting motion to the driven element with a corresponding short rest period.

What is claimed is:

1. An intermittent gear consisting of a Geneva drive mechanism comprising a rotary driving element having a driving projection, a rotary driven element having radial grooves into which the driving projection is adapted to engage over a period of a cycle which is greater than the rest period, and means for locking the driven member positively against rotation during the rest period, said locking means comprising a stop member revoluble around an axis parallel with, and eccentric to, that of the driven member, and adapted to be engaged intermittently with a series of parts associated with the driven member and revoluble respectively in a circular path concentric therewith.

2. An intermittent gear consisting of a Geneva drive mechanism comprising a rotary driving element having a driving pin, a driven element having radial grooves into which said pin is adapted to engage to impart an intermittent rotation to the driven element, said pin entering and leaving the grooves from the inner ends thereof whereby the driving phase extends over a greater part of the cycle of the driving element than the rest period, and means for locking the driven element positively against rotation during each rest period, said locking means comprising an arcuate stop member revoluble around an axis parallel with and eccentric to, that of the driven member, and adapted to be engaged intermittently with a series of parts associated with the driven member, and revoluble in a circular path concentric therewith.

3. An intermittent gear consisting of a Geneva drive mechanism comprising a rotary driving element having a driving pin, a driven element having four radial grooves located on diameters at right angles, said pin being adapted to enter and leave the grooves from the inner ends thereof whereby the driving phase of the driving element is 270° and the rest period 90° of its cycle, said driving pin being limited to movement through approximately one-half of the radius defined by each groove, so that the speed ratio is characterized by rapid inter-cycle acceleration and deceleration.

4. An intermittent gear consisting of a Geneva drive mechanism comprising a rotary driving element having a driving pin, a driven element having radial grooves into which said pin is adapted to engage to impart an intermittent rotation to the driven element, said pin entering and leaving the grooves from the inner ends thereof whereby the driving phase supervenes over a greater part of the cycle of the driving element than the rest period, and means for locking the driven element positively against rotation during the rest period, said locking means comprising a stop member revoluble around an axis parallel with, and eccentric to, that of the driven member and adapted to be engaged intermittently with a series of parts associated with the driven member and revoluble respectively in a circular path concentric therewith.

5. An intermittent gear consisting of a Geneva drive mechanism comprising a rotary driving element having a driving pin, a driven element having radial grooves into which said pin is adapted to engage to impart an intermittent rotation to the driven element, said pin entering and leaving the grooves from the inner ends thereof whereby the driving phase supervenes over a greater part of the cycle of the driving element than the rest period, and means for locking the driven element positively against rotation during the rest period, said locking means comprising pairs of pins mounted on said driven element and located on either side of the grooves adjacent to the outer end thereof, and a cooperating locking segment mounted on the driving element and concentric with the axis thereof.

6. An intermittent gear consisting of a Geneva drive mechanism comprising a rotary driving element having a driving pin, a driven element having radial grooves into which said pin is adapted to engage to impart an intermittent rotation to the driven element, said pin entering and leaving the grooves from the inner ends thereof whereby the driving phase supervenes over a greater part of the cycle of the driving element than the rest period, and means for locking the driven element positively against rotation during the rest period, said locking means comprising a series of pins projecting from the grooved face of the driven member, equal in number to said grooves and equally spaced therefrom and at a distance from the axis of said member so that they are co-axial with the axis of the element during a rest period, and a cooperating curved locking segment mounted on the driving element co-axial therewith.

7. An intermittent gear consisting of a Geneva drive mechanism comprising a rotary driving element having a driving pin, a driven element having radial grooves into which said pin is adapted to engage to impart an intermittent rotation to the driven element, said pin entering and leaving the grooves from the inner ends thereof whereby the driving phase supervenes over a greater part of the cycle of the driving element than the rest period, and means for locking the driven element positively against rotation during the rest period, said locking means comprising a rotary locking sector eccentric to the driven element, and driven from the driving element by a 1:1 gear, and a plurality of locking grooves on the driven element one for each driving groove, said locking grooves being struck from the axis of the locking sector, and adapted to be engaged successively by said sector during non-driving periods.

JACK SHACKLETON.